No. 642,283. Patented Jan. 30, 1900.
E. C. BARKER.
BICYCLE SUPPORT.
(Application filed June 13, 1899.)
(No Model.)
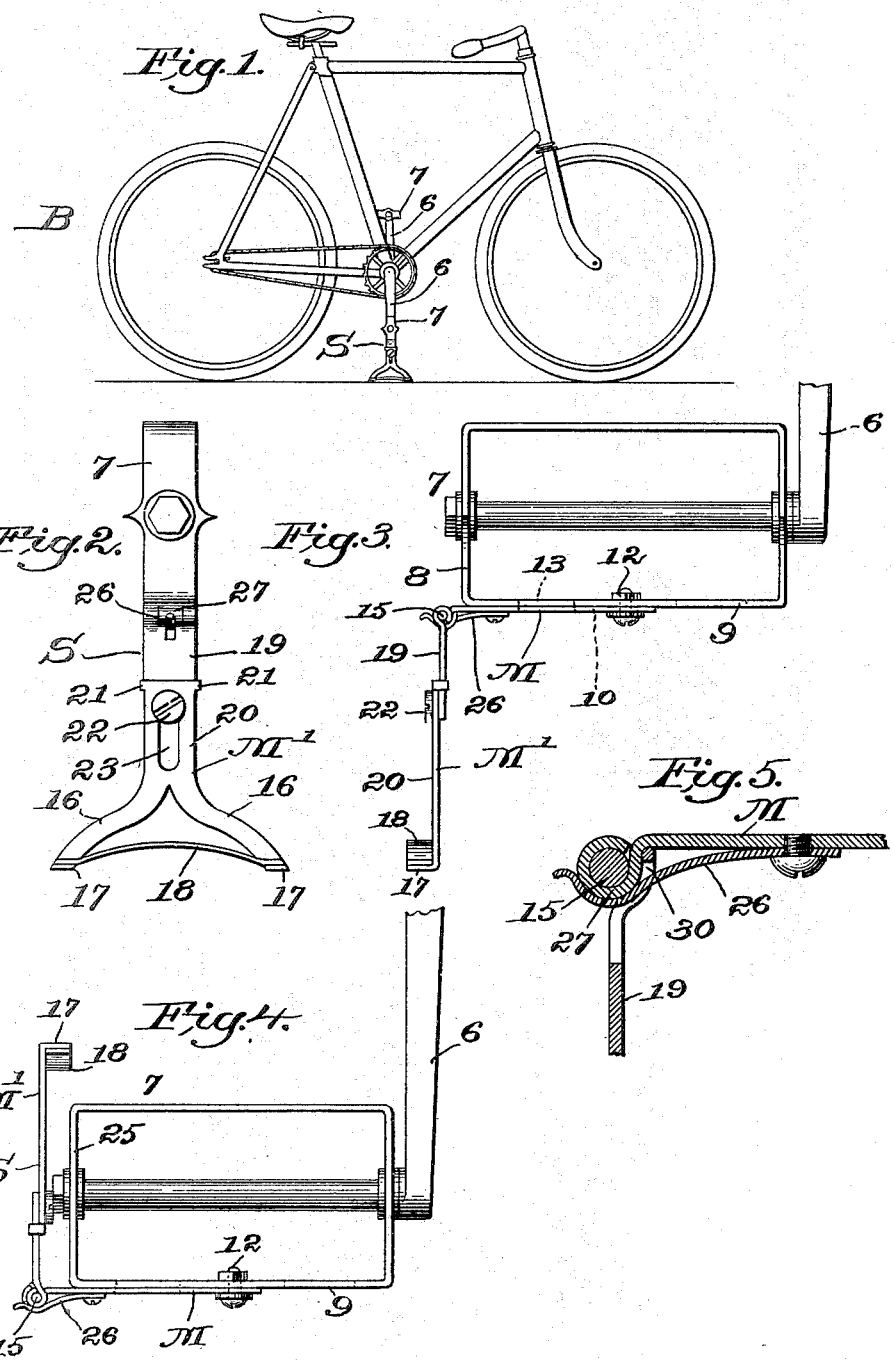

UNITED STATES PATENT OFFICE.

ERNEST C. BARKER, OF KEENE, NEW HAMPSHIRE.

BICYCLE-SUPPORT.

SPECIFICATION forming part of Letters Patent No. 642,283, dated January 30, 1900.

Application filed June 13, 1899. Serial No. 720,340. (No model.)

*To all whom it may concern:*

Be it known that I, ERNEST C. BARKER, of Keene, county of Cheshire, State of New Hampshire, have invented an Improvement in Bicycle-Supports, of which the following description, in connection with the accompanying drawings, is a specification, like letters and numerals on the drawings representing like parts.

This invention relates to a cycle-support intended, primarily, for attachment to the pedal or other like member of a bicycle or other similar vehicle; and the object of the invention is to provide a simple and easily and quickly operable device of the character specified, involving a prop or leg which is mounted in such a position as to be normally held against the outer end of a pedal or analogous member, where it is out of the way and where it occupies a small amount of space, and which is readily shiftable into operative position to sustain the wheel, thereby obviating the necessity of resting the latter with a pedal against a curb, as in such a case as this the liability of the wheel being blown or pushed over is marked.

In the drawings accompanying and forming a part of this specification and representing the device in a simple and convenient embodiment thereof, Figure 1 is a side view of a bicycle of ordinary construction provided with a support involving my improvements. Fig. 2 is an edge view of the pedal equipped with the device and showing the prop or leg down and in a position to support a wheel. Fig. 3 is a rear view of the same. Fig. 4 is a similar view with the prop or leg in its normal position, and Fig. 5 is a sectional detail view of a hinge connection between the two members of the appliance and also illustrating a means for holding the prop or leg in its two extreme positions.

In the drawings I have shown the device in its preferred embodiment and as employed in connection with a bicycle B of ordinary construction and provided with the usual cranks 6, having the pedals 7 at their free ends.

The device is denoted in a general way by S, and I prefer to connect it with a pedal 7, and said pedal includes in its construction an open frame 8 of substantially rectangular shape, to the longitudinal side member 9 of which the support S may be attached.

The support S involves in its organization two members M and M', the part M being in the nature of a body portion, while the part M' constitutes the supporting leg or prop when it is in its shifted position or swung down in contact with the ground for sustaining the cycle, and each of these members is of substantially plate form. The member M has a longitudinal slot 10 to receive a screw or other fastening device, as 12, adapted to pass through the usual longitudinal slot 13, formed in the side member 9 of the pedal-frame, and the longitudinal slot 10 in the body member M permits a certain amount of adjustment of the support to readily adapt the same to pedals of different lengths.

The means described for clamping the support to the pedal and for also effecting the adjustment of the same are simple ones, although, of course, other and equally simple means can be employed in lieu thereof without departing from the spirit of the invention.

The joint between the members M and M' is in the nature of a pivotal one, and it includes a pin 15, adapted to pass through registering ears on the two sections, whereby the leg can be readily swung into or out of its supporting position.

The leg or prop M' is of substantially U shape, and the branches 16 of the U are provided with transverse feet 17, adapted to rest directly upon the ground and to be connected by the curved cross piece or brace 18, which adds to the stability of the appliance at the point where the maximum weight is upheld.

The leg or support M' is extensible, thus providing an adjustment to adapt the same to pedals supported at different heights from the ground, and it consists in the present instance of two parts, as 19 and 20, the part 19 being directly united to the body M and serving to slidably support the part 20, and the latter has the overturned lugs or offsets 21, disposed in parallelism and adapted to engage the opposite straight edges of the part 19 and constituting guides to prevent side play or motion of the Y-shaped part 20.

Any convenient means may be provided for connecting the two parts 19 and 20, whereby the last-mentioned one can be adjusted longitudinally or otherwise upon its companion; but for this purpose I have represented a screw 22, which passes through the longitudinal slot 23 in the part 20 and is in threaded engagement with the part 19, and by driving said screw home said two parts can be clamped firmly together. By loosening the screw the part 20 can be freely adjusted relatively to its mate and held in a fixed relation by retightening the clamping-screw 22.

In Fig. 4 the member M' is represented as in its normal and ineffective position, at which time it is disposed substantially in parallelism with and adjacent to the outer and transverse member 25 of the pedal-shaft, and it is held in such position by a suitable device, as the leaf-spring 26, secured to the body M and adapted to bear against the rounded lug 27 of the part N', said free end being also rounded to increase its holding effect upon the part M', either to hold the latter in its normal position or in its shifted or cycle-holding position, as shown in Figs. 1, 2, and 3. When it is desired to shift the part M', it can be grasped at any point in its length and swung into contact with the ground and will serve to effectually uphold the cycle against all ordinary jars.

It is desirable that the prop or leg M' should be held against inward movement when it has reached a substantially vertical position, as shown in Figs. 3 and 5, and for this purpose I have represented it as provided with a rounded open offset 30, which is adapted, when said leg reaches its cycle-supporting position, to strike what is for the time being the under flat face of the part M, as clearly indicated in Fig. 5, thereby to limit the shifting movement of the leg, it being understood that as the center of gravity of the bicycle is supported inwardly beyond the hinged leg the tendency of the weight will be to flex said leg or force it inward; but this action is effectually resisted by the provision of the limiting or stop device 30.

Having described my invention, what I claim, and desire to secure by Letters Patent, is—

The combination with a bicycle-pedal having a longitudinally-slotted side bar, of a plate adapted to fit flatwise against said side bar and to slide thereon in the direction of its length, a connecting and clamping device uniting said side bar and plate and passing through the slot, a leg consisting of two sections one of which is slidable upon the other and is provided with a pair of lugs adapted to engage its companion, an adjusting and clamping device uniting the two parts of the leg, and a spring secured to the plate and its free end bearing against the leg.

In testimony whereof I have signed my name to this specification in the presence of two subscribing witnesses.

ERNEST C. BARKER.

Witnesses:
HEATH SUTHERLAND,
FREDERICK L. EMERY.